United States Patent
Inoue

(10) Patent No.: US 9,535,682 B2
(45) Date of Patent: Jan. 3, 2017

(54) METHOD OF DETERMINING WHETHER INPUT OPERATION DIALOGUE IS DISPLAYABLE AND COMPUTER SYSTEM

(71) Applicant: Hitachi, Ltd., Tokyo (JP)

(72) Inventor: Takafumi Inoue, Tokyo (JP)

(73) Assignee: HITACHI, LTD., Tokyo (JP)

(*) Notice: Subject to any disclaimer, the term of this patent is extended or adjusted under 35 U.S.C. 154(b) by 177 days.

(21) Appl. No.: 14/365,537

(22) PCT Filed: Dec. 27, 2013

(86) PCT No.: PCT/JP2013/085221
§ 371 (c)(1),
(2) Date: Jun. 13, 2014

(87) PCT Pub. No.: WO2015/097896
PCT Pub. Date: Jul. 2, 2015

(65) Prior Publication Data
US 2016/0004525 A1    Jan. 7, 2016

(51) Int. Cl.
G06F 9/46       (2006.01)
G06F 9/445     (2006.01)
H04L 29/08     (2006.01)

(52) U.S. Cl.
CPC .............. G06F 8/65 (2013.01); G06F 9/445 (2013.01); H04L 67/10 (2013.01)

(58) Field of Classification Search
None
See application file for complete search history.

(56) References Cited

U.S. PATENT DOCUMENTS

| 8,655,307 B1* | 2/2014 | Walker .............. H04W 52/0212 455/343.5 |
| 2012/0185843 A1* | 7/2012 | Burke ....................... G06F 8/62 717/174 |

FOREIGN PATENT DOCUMENTS

| JP | 2005-070882 A | 3/2005 |
| JP | 2008-186147 A | 8/2008 |
| JP | 2009-217517 A | 9/2009 |
| JP | 2012-165408 A | 8/2012 |

* cited by examiner

Primary Examiner — H S Sough
Assistant Examiner — Deric Ortiz
(74) Attorney, Agent, or Firm — Volpe and Koenig, P.C.

(57) ABSTRACT

A method of determining whether a dialogue is displayable includes recording a previous software use state in a terminal which has been responded to an input operation to the terminal, comparing the recorded previous software use state with a current software use state in the terminal, and displaying an input operation dialogue according to a result of the comparison.

12 Claims, 14 Drawing Sheets

| USER ID 113a | USER NAME 113b | DEPARTMENT 113c | TITLE 113d | OCCUPATIONAL CATEGORY 113e |
|---|---|---|---|---|
| 1 | USER A | A DEPARTMENT | PERSON IN CHARGE | SALES |
| 2 | USER B | B DEPARTMENT | SENIOR STAFF | SALES |
| 3 | USER C | A DEPARTMENT | MANAGER | ADMINISTRATION |
| 4 | USER D | B DEPARTMENT | PERSON IN CHARGE | SE |

| DEPARTMENT ID 116a-1 | DEPARTMENT 116a-2 |
|---|---|
| 1 | A DEPARTMENT |
| 2 | B DEPARTMENT |

(b)

| TITLE ID 116b-1 | TITLE 116b-2 |
|---|---|
| 1 | PERSON IN CHARGE |
| 2 | SENIOR STAFF |
| 3 | MANAGER |

(c)

| OCCUPATION ID 116c-1 | OCCUPATIONAL CATEGORY 116c-2 |
|---|---|
| 1 | SALES |
| 2 | ADMINISTRATION |
| 3 | SE |

FIG. 6

(a) SOFTWARE BEING ACTIVATED

| OPERATION ID | USER ID | 101 | 102 | 103 | 104 | 105 | 106 | OPERATION RESULT |
|---|---|---|---|---|---|---|---|---|
| 1 | 2 | 0 | 1 | 0 | 1 | 0 | 1 | 1 |
| 2 | 3 | 1 | 0 | 0 | 0 | 0 | 0 | -1 |
| 3 | 3 | 1 | 0 | 0 | 0 | 0 | 1 | 1 |
| 4 | 1 | 0 | 0 | 0 | 0 | 1 | 1 | 1 |
| 5 | 4 | 0 | 0 | 0 | 1 | 1 | 0 | -1 |

(b) SOFTWARE BEING USED AT FOREFRONT

| OPERATION ID | USER ID | 101 | 102 | 103 | 104 | 105 | 106 | OPERATION RESULT |
|---|---|---|---|---|---|---|---|---|
| 1 | 2 | 0 | 0 | 0 | 0 | 0 | 1 | 1 |
| 2 | 3 | 1 | 0 | 0 | 0 | 0 | 0 | -1 |
| 3 | 3 | 0 | 0 | 0 | 0 | 0 | 1 | 1 |
| 4 | 1 | 0 | 0 | 0 | 0 | 0 | 1 | 1 |
| 5 | 4 | 0 | 0 | 0 | 0 | 1 | 0 | -1 |

(c) OPERATION TIMING

| OPERATION ID | USER ID | 09:00 ~12:00 | 12:00 ~15:00 | 15:00 ~18:00 | 18:00 ~21:00 | OPERATION RESULT |
|---|---|---|---|---|---|---|
| 1 | 2 | 0 | 1 | 0 | 0 | 1 |
| 2 | 3 | 1 | 0 | 0 | 0 | -1 |
| 3 | 3 | 1 | 0 | 0 | 0 | 1 |
| 4 | 1 | 0 | 1 | 0 | 0 | 1 |
| 5 | 4 | 0 | 0 | 1 | 0 | -1 |

FIG. 7

(a) SOFTWARE BEING ACTIVATED     118

| DEPARTMENT | TITLE | OCCUPATIONAL CATEGORY | 101 | 102 | 103 | 104 | 105 | 106 |
|---|---|---|---|---|---|---|---|---|
| A DEPARTMENT | PERSON IN CHARGE | SALES | -0.5 | 0.3 | 0 | -0.1 | 0.1 | 0.5 |
| B DEPARTMENT | NEW FACE | SALES | -0.7 | 0.3 | 0 | 0.1 | -0.1 | 0.4 |
| A DEPARTMENT | MANAGER | ADMINISTRATION | -0.6 | 0.4 | 0 | 0 | 0.1 | 0.4 |

(b) SOFTWARE BEING USED AT FOREFRONT

| DEPARTMENT | TITLE | OCCUPATIONAL CATEGORY | 101 | 102 | 103 | 104 | 105 | 106 |
|---|---|---|---|---|---|---|---|---|
| A DEPARTMENT | PERSON IN CHARGE | SALES | -0.5 | 0.3 | 0 | -0.1 | 0.1 | 0.5 |
| B DEPARTMENT | NEW FACE | SALES | -0.7 | 0.3 | 0 | 0.1 | -0.1 | 0.4 |
| A DEPARTMENT | MANAGER | ADMINISTRATION | -0.6 | 0.4 | 0 | 0 | 0.1 | 0.4 |

(c) AVERAGE OF OPERATION PERIODS OF TIME

| DEPARTMENT | TITLE | OCCUPATIONAL CATEGORY | 101 | 102 | 103 | 104 | 105 | 106 |
|---|---|---|---|---|---|---|---|---|
| A DEPARTMENT | PERSON IN CHARGE | SALES | 10m | 20s | 30m | 1h | 5m | 50s |
| B DEPARTMENT | NEW FACE | SALES | 50s | 20s | 15m | 50m | 10m | 40s |
| A DEPARTMENT | MANAGER | ADMINISTRATION | 5m | 50s | 10m | 20m | 15m | 50s |

(d) OPERATION TIMING

| DEPARTMENT | TITLE | OCCUPATIONAL CATEGORY | 09:00 ~12:00 | 12:00 ~15:00 | 15:00 ~18:00 | 18:00 ~21:00 |
|---|---|---|---|---|---|---|
| A DEPARTMENT | PERSON IN CHARGE | SALES | -0.1 | 0.2 | 0.5 | 0 |
| B DEPARTMENT | NEW FACE | SALES | 0.1 | -0.2 | -0.2 | 0.3 |
| A DEPARTMENT | MANAGER | ADMINISTRATION | 0.9 | 0.1 | 0.4 | -0.9 |

FIG. 15

ASSET/DISTRIBUTION MANAGEMENT SYSTEM

DEVICE LIST

| | DEVICE | USER | DEPARTMENT | TITLE | OCCUPATIONAL CATEGORY |
|---|---|---|---|---|---|
| ☑ | A | 1 | A DEPARTMENT | PERSON IN CHARGE | SALES |
| ☑ | B | 2 | A DEPARTMENT | MANAGER | SALES |
| ☐ | C | 3 | B DEPARTMENT | MANAGER | ADMINISTRATION |

OPERATION MENU

FIG. 16

ASSET/DISTRIBUTION MANAGEMENT SYSTEM

DEVICE LIST

| | DEVICE | USER |
|---|---|---|
| ☑ | A | 1 |
| ☑ | B | 2 |
| ☐ | C | 3 |

SOFTWARE DISTRIBUTION

USER INFORMATION INPUT

OPERATION MENU

METHOD OF DETERMINING WHETHER INPUT OPERATION DIALOGUE IS DISPLAYABLE AND COMPUTER SYSTEM

TECHNICAL FIELD

The present invention relates to a method of determining whether a dialogue is displayable in an input operation of an operator of a terminal. Particularly, the present invention relates to a method of preventing the likelihood that a display of a dialogue disturbs an operator's business.

BACKGROUND ART

PTL 1 discloses a technique in which a burden on an operator of a terminal is considered concerning asset management related to information processing or a software distribution function. PTL 1 discloses a software update system of reducing a burden on a user (an operator of a terminal), and a software update frequency is adjusted based on a frequency of use from a use state of software for each user.

CITATION LIST

Patent Literature

PTL 1: JP 2009-217517 A

SUMMARY OF INVENTION

Technical Problem

There are various cases in which an operation such as information processing-related asset management or software distribution gives a burden on the user (the operator of the terminal). For example, in a software distribution function (when software of an interactive installation format is distributed) or a user information input function of an information-related asset, when an administrator executes the function at a unilateral timing without considering the user's business circumstances, it requests the user to perform an operation, or a dialogue is displayed during business, and thus the user's business is disturbed, and a burden is given.

However, in the technique of the related art disclosed in PTL 1, the user's burden can be reduced by reducing the software update frequency, but it is difficult to prevent the likelihood that the user's business is disturbed at a software update timing. Further, it is hard to apply the technique disclosed in PTL 1 to an input of new software distribution or information processing-related asset management.

It is an object of the present invention to control a display timing of a dialogue necessary for an operator's task based on a state in an input operation of an operator of a terminal.

Solution to Problem

A method of determining whether a dialogue is displayable, including: recording a previous software use state in a terminal which has been responded to an input operation to the terminal; comparing the recorded previous software use state with a current software use state in the terminal; and displaying an input operation dialogue according to a result of the comparison is disclosed.

Advantageous Effects of Invention

According to the present invention, it is possible to control a display timing of a dialogue necessary for an operator's task.

BRIEF DESCRIPTION OF DRAWINGS

FIG. 2 is a diagram illustrating a configuration of a user information table.
FIG. 3 is a diagram illustrating a configuration of a group information table.
FIG. 6 is a diagram illustrating a configuration of an analysis information table (dynamic generation).
FIG. 7 is a diagram illustrating a configuration of an analysis result table (dynamic generation).
FIG. 15 illustrates an exemplary screen used to select an apparatus of an operator.
FIG. 16 illustrates an exemplary screen used to select an operation menu.

Figure 1:
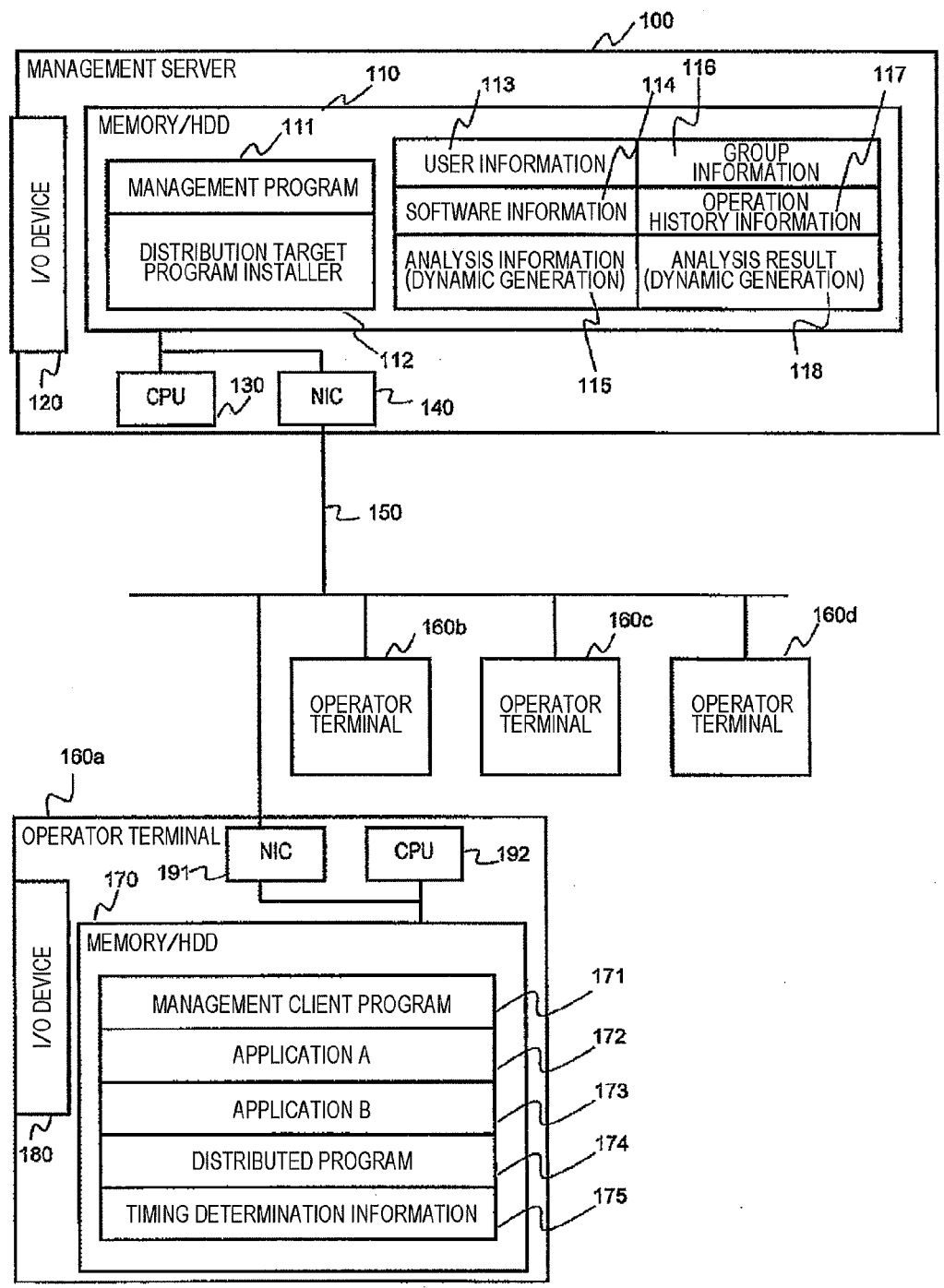
FIG. 1 is a configuration diagram of a computer system according to the present embodiment.

DESCRIPTION OF EMBODIMENTS (System Configuration)
FIG. 1 is a configuration diagram of a computer system (hereinafter, "system") according to the present embodiment. The system is configured such that a management server 100 is connected with a plurality of operator terminals 160a to 160d via a network 150.

The management server 100 includes an input/output (I/O) device 120 through which an administrator performs an I/O operation, a memory/HDD 110 serving as a storage apparatus, a central processing unit (CPU) 130, and an NIC 140 serving as an interface (I/F) to the network 150. The memory/HDD 110 stores a management program 111 serving as a main entity of an operation in the management server 100, a program including a distribution target program installer 112 of distributing a program to each operator terminal, and various kinds of information such as user information 113, software information 114, analysis information (dynamic generation) 115, group information 116, operation history information 117, and analysis result (dynamic generation) 118. The analysis information 115, and the analysis result 118 are dynamically generated as the management program 111 is executed as will be described later.

The operator terminal 160 includes an I/O device 180 through which an operator performs an I/O operation, a memory/HDD 170 serving as a storage apparatus, a CPU 192, and an NIC 191 serving as an I/F to the network 150. The memory/HDD 170 stores a management client program 171 serving a main entity of an operation in the operator terminal 160, programs such as an application A 172, an application B 173, and a distributed program 174, and timing determination information 175.

In the following description, expressions such as "aaa table," "aaa list," "aaa database (DB)," and "aaa queue" are used, but the information need not be necessarily expressed by a data structure such as a table, a list, a DB, or a queue. For this reason, in order to indicate independence from a data structure, there are cases in which "aaa table," "aaa list," "aaa DB," "aaa queue," or the like is referred to as "aaa information."

Further, when content of each information is described, expressions such as "identification information," "identifier, " "title," "name," or "ID" are used, but these expressions can be replaced with each other.

In the following description, there are cases in which a description proceeds using a "program" as a subject, but since a program performs a process decided as it is executed by a processor while using a memory, a communication port (a communication control apparatus), or the like, a description may proceed using a processor as a subject. Further, a process in which a program is disclosed as a subject may be a process performed by a computer such as a management server or an information processing apparatus. Furthermore, a part or all of a program may be implemented by dedicated hardware.

Further, various kinds of programs may be installed in a program distribution server or in each computer through a computer-readable memory medium. In this case, the program distribution server includes a CPU and storage resources, and storage resources store a distribution program and a program of a distribution target. As the distribution program is executed by the CPU, the CPU of the program distribution server distributes a distribution target program to another computer.

Further, a management computer includes an I/O device. As an example of the I/O device, a display, a keyboard, or a pointer apparatus is considered, but any other apparatus may be used. Further, instead of the I/O device, a serial interface or an Ethernet (a registered trademark) interface may be used as an I/O device, the corresponding interface may be connected with a display computer including a display, a keyboard, or a pointer apparatus, and an input and a display in the I/O device may be replaced by transmitting display information to a display computer or receiving input display information from the display computer and performing a display through the display computer.

Further, there are cases in which a set of one or more computers managing an information processing system and displaying display information are referred to as a "management system." When the management computer displays display information, the management computers serve as the management system, and a combination of the management computer and the display computer serves as the management system as well. Further, in order to increase a speed or reliability of a management process, the same process as in the management computer may be implemented by a plurality of computers. In this case, the corresponding computers (including the display computer as well when the display computer performs a display) serve as the management system.

(Various Kinds of Information)

FIG. 2 illustrates a user information table 113 storing information (profile information of a user who is an operator) related to each user, and the user information table 113 stores a user ID 113*a*, a user title 113*b*, a department 113*c* to which the user belongs, a title 113*d*, and an occupational category 113*e* for each user. The information is created by an input by the administrator, information acquisition from the operator by a user information input function of an information processing-related asset, and information acquisition by active directory collaboration. The user refers to the operator who operates the terminal 160.

FIG. 3 illustrates a group information table 116, and three tables (a), (b), and (c) configuring the group information table 116 are information in which a department ID 116*a*-1 to which each user belongs, a title ID 116*b*-1, and an occupational category ID 116*c*-1 are associated with a department 116*a*-2, a title 116*b*-2, and an occupational category 116*c*-2, respectively. The group information table 116 is created as necessary when data related to a new user is added to the user information table 113 illustrated in FIG. 2. The group information table 116 is not essential information in the present embodiment but information necessary to efficiently operate the system of the present embodiment.

Figure 4:
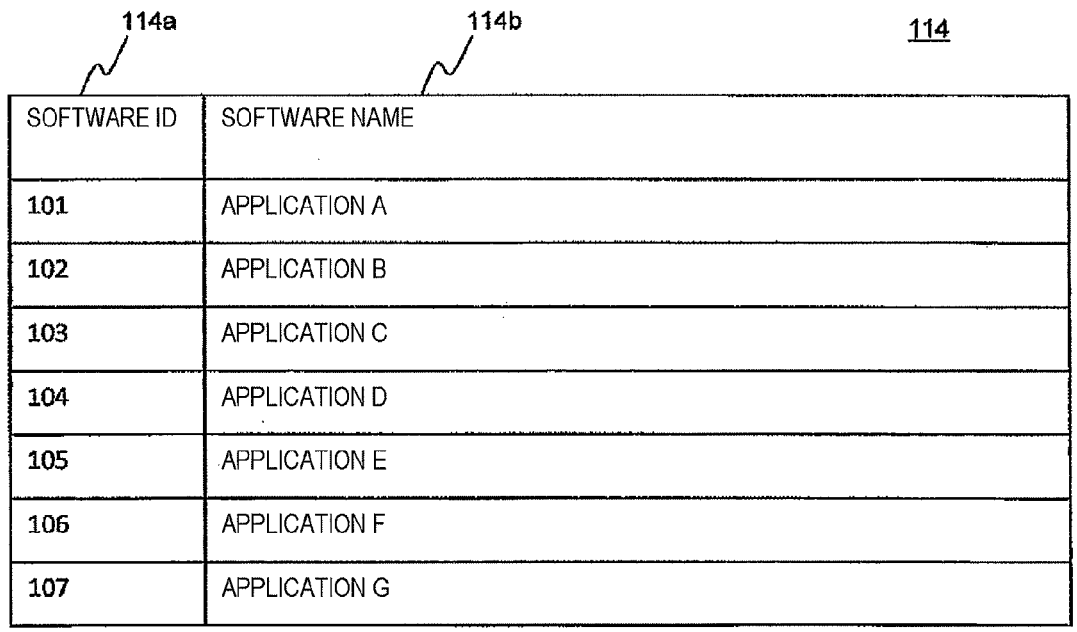
FIG. 4 is a diagram illustrating a configuration of a software information table.

FIG. 4 illustrates a software information table 114 in which a software ID 114*a* and a software name 114*b* of each software are associated with each other, and the software information table 114 is created by collecting software information from each operator terminal through an inventory information collecting function.

Figure 5:
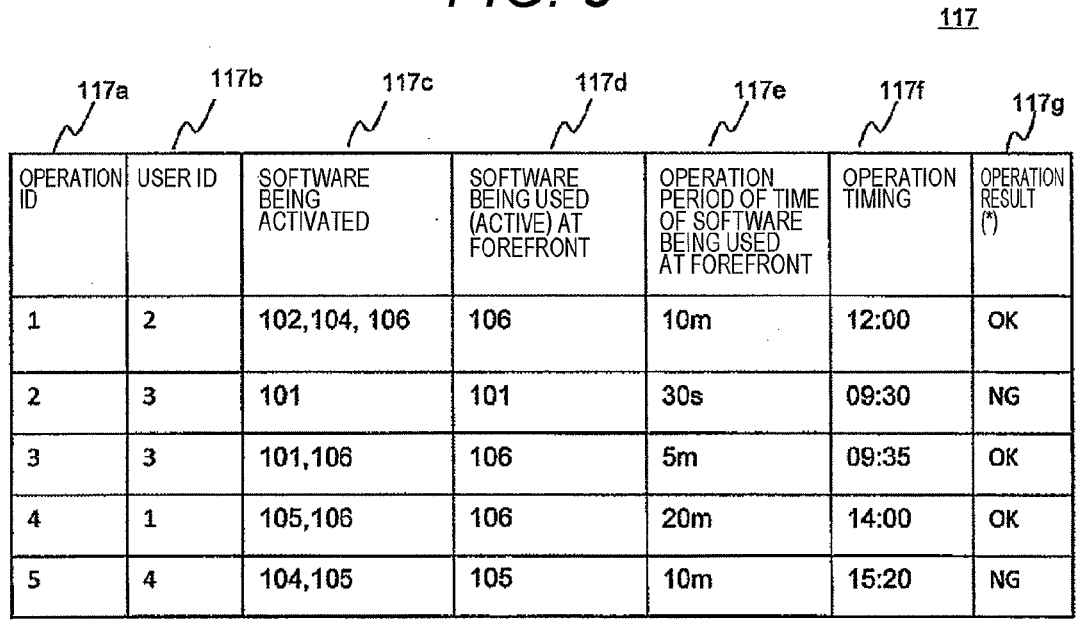
FIG. 5 is a diagram illustrating a configuration of an operation history information table.

FIG. 5 illustrates an operation history information table 117 in which an operation result and an operation state on an input or an operation to each operator terminal 160 are received from each operator terminal and stored. The operation history information table 117 includes an operation ID 117*a* which is a number used to identify each record in the table, a user ID 117*b* of the operator, a software 117*c* (the software ID 114*a* illustrated in FIG. 4) being activated, software 117*d* (a software ID corresponding to a topmost screen in a hierarchy of an operation screen) being used (activated) at the forefront, an operation period of time 117*e* (as a unit of an operation period of time, "s" indicates a second, "m" indicates a minute, and "h" indicates a hour), an operation timing 117*f* (an operation start timing), and an operation result 117*g* ("OK" or "NG").

FIG. 6 illustrates an analysis information table 115 dynamically generated according to an operation of each operator terminal 160, and data of the analysis information table 115 is updated at certain time intervals. The analysis information table 115 includes a table (a) storing information related to software being activated, a table (b) storing information related to software being used at the forefront, and a table (c) storing information related to an operation timing.

The table (a) includes an operation ID 115*a*-1 which is a number used to identify each record in the table, a user ID 115*a*-2 of the operator, software IDs 115*a*-3 to 115*a*-8 associated with the operation, and an operation result 115*a*-9.

The table (b) includes an operation ID 115*b*-1 which is a number used to identify each record in the table, a user ID 115*b*-2 of the operator, software IDs 115*b*-3 to 115*b*-8 associated with the operation, and an operation result 115*b*-9.

The table (c) includes an operation ID 115*c*-1 which is a number used to identify each record in the table, a user ID 115*c*-2 of the operator, operation timings 115*c*-3 to 115*c*-6 of the terminal, and an operation result 115*c*-7.

The tables (a), (b), and (c) of the analysis information table 115 is created based on the operation history information table 117 of FIG. 5. The operation results 115*a*-9, 115*b*-9, and 115*c*-7 are based on the operation result 117*g* of the operation history information table 117, that is, "1" is stored in when the operation result is "OK," and "−1" is stored when the operation result is "NG." In the software IDs 115*a*-3 to 115*a*-8 of the table (a), "1" is stored for software being activated, and "0" is stored for software being not activated. In the software IDs 115*b*-3 to 115*b*-8 of the table (b), "1" is stored for software being used at the forefront, and "0" is stored for other software. In the operation timings 115*c*-3 to 115*c*-6 of the table (c), "1" is stored in a time zone including a time at which the terminal 160 is operated, and "0" is stored in the other time zones.

FIG. 7 illustrates an analysis result table 118 which is dynamically generated according to an operation of each operator terminal 160, and data of the analysis result table 118 is updated at certain time intervals. The analysis result table 118 includes a table (a) storing information related to software being activated, a table (b) storing information related to software being used at the forefront, a table (c) storing information related to an average of operation periods of time, and a table (d) storing information related to an operation timing.

The table (a) stores information related to software being activated, and includes a department 118*a*-1 to which the operator belongs, a title 118*a*-2 of the operator, an occupational category 118*a*-3 of the operator, and software IDs 118*a*-4 to 118*a*-9 associated with the operator's operation. A regression coefficient value of each software obtained by, for example, regression analysis which will be described later is stored in each of columns corresponding to the software IDs 18*a*-4 to 118*a*-9.

The table (b) stores information related to software being used at the forefront, has the same configuration as the table (a), and includes a department 118*b*-1 to which the operator belongs, a title 118*b*-2 of the operator, an occupational category 118*b*-3 of the operator, and software IDs 118*b*-4 to 118*b*-9 associated with the operator's operation. A regression coefficient value related to whether each software is activatable which is obtained by, for example, regression analysis which will be described later is stored in each of columns corresponding to the software IDs 118*b*-4 to 118*b*-9.

The table (c) stores information related to an average of operation periods of time, has the same configuration as the table (a), and includes a department 118*c*-1 to which the operator belongs, a title 118*c*-2 of the operator, an occupational category 118*c*-3 of the operator, and software IDs 118*c*-4 to 118*c*-9 associated with the operator's operation. An average of operation periods of time of each software is stored in each of columns corresponding to the software IDs 118*c*-4 to 118*c*-9.

The table (d) stores information related to an operation timing, has the same configuration as the table (a), and includes a department 118*d*-1 to which the operator belongs, a title 118*d*-2 of the operator, an occupational category 118*d*-3 of the operator, and software IDs 118*d*-4 to 118-9 associated with the operator's operation. A regression coefficient value related to whether each software is activatable which is obtained by, for example, regression analysis which will be described later is stored in each of columns corresponding to the software IDs 118*d*-4 to 118*d*-9.

The tables (a), (b), (c), and (d) are created based on the analysis result based on the analysis information table 115 of FIG. 6.

Information obtained by extracting a corresponding row (record) in each of the four tables (a) to (d) of FIG. 7 for each operator terminal 160 is "timing determination information" which will be described later, and the "timing' determination information" is transmitted from the management server 100 to each operator terminal 160.

For "software being activated" of the table (a) and "software being used at the forefront" of the table (b), software having a high numerical value (regression coefficient) is determined to be high in a probability that the operator will operate when the software is being activated or used at the forefront (the regression coefficient has a value between −1 to +1). Further, when an analysis method other than the regression analysis is used, there are cases in which software having a low numerical value is high in a probability that the operator will operate the software. In other words, it is desirable to obtain a probability that the operator will operate or a normalized probability, and any other analysis method may be used. For "operation timing" of the table (d), a time zone having a high numerical value is determined to be high in a probability that the operator will operate.

"Average of operation periods of time" of the table (c) is used to determine whether it is possible to perform an operation using "software being used at the forefront" of the table (b).

In the analysis result table 118 of FIG. 7, each data is grouped according to the department, the title, and the occupational category of the operator and analyzed, and the result is illustrated, but without performing grouping, analysis may be performed of each operator, or analysis may be performed by regarding all data as one group. In this case, the administrator may select a criterion (a criterion such as whether grouping is performed as in FIG. 7, whether grouping is performed for each operator, or whether all data are regarded as one group) related to grouping on a screen in advance.

(Explanation of Process)

Figure 8:
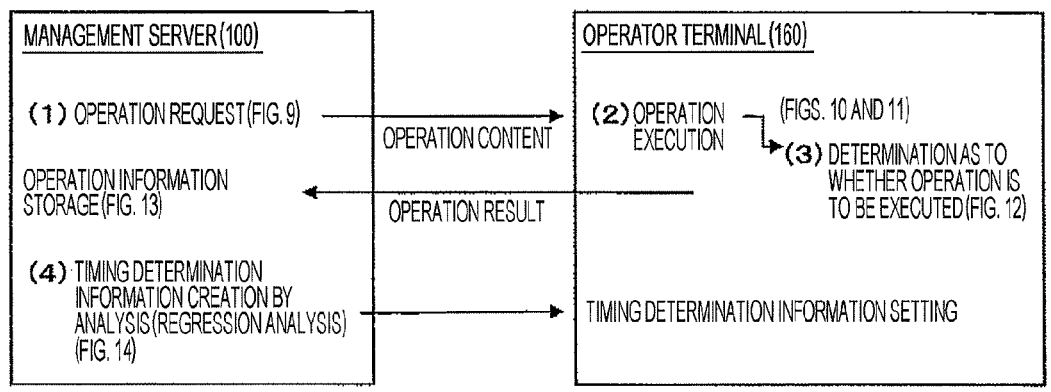
FIG. 8 is a diagram illustrating a process outline according to the present embodiment.

FIG. 8 illustrates an outline of a process according to the present embodiment.

In the system in which the management server 100 is connected with the plurality of operator terminals 160 via the network 150, the following process is performed. A diagram number in parentheses ( ) is a number of a diagram illustrating the flow of corresponding process.

Figure 9:
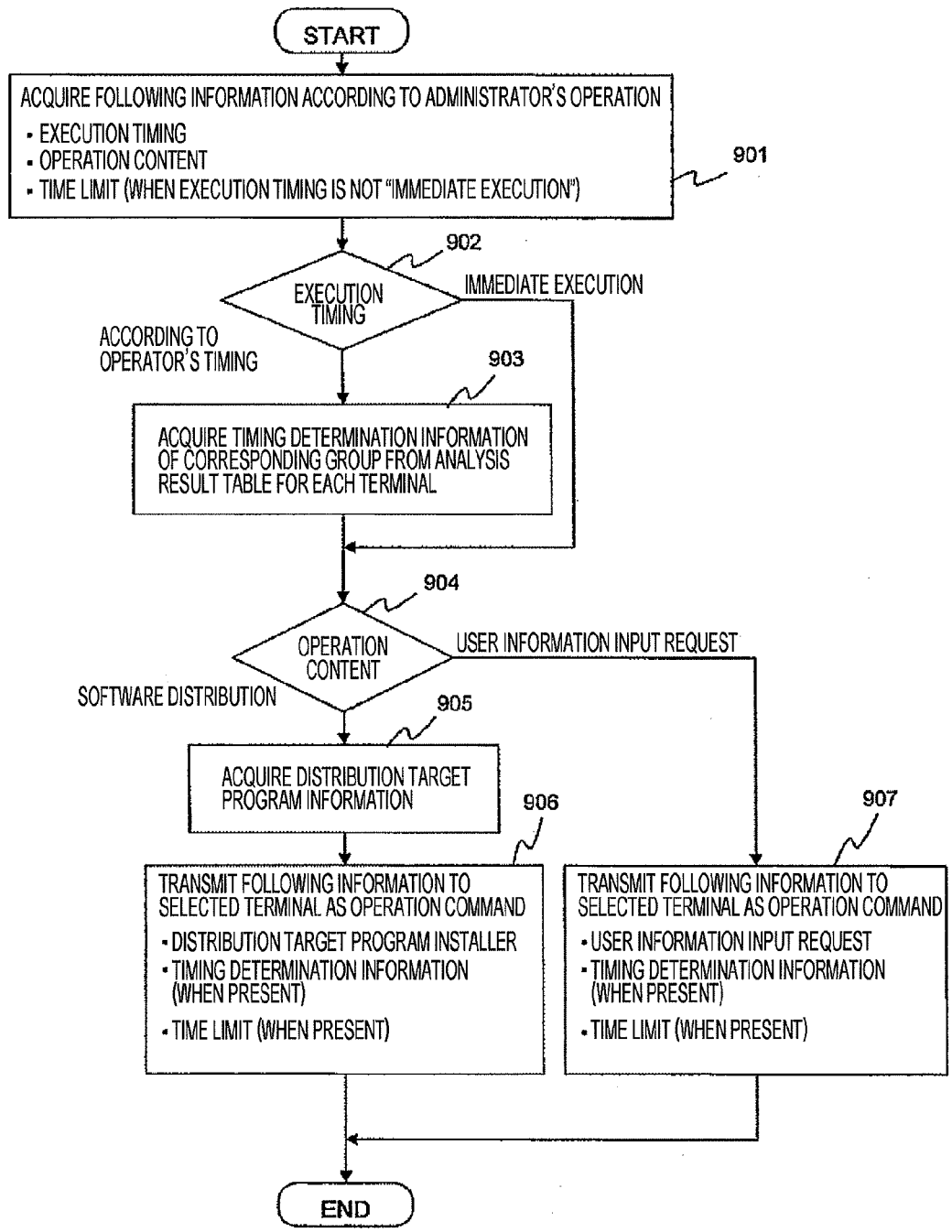
FIG. 9 is a flowchart illustrating a process of a management program.

(1) The management server 100 receives content of an operation which is requested to be performed by the operator of the terminal 160 as the administrator performs a screen operation through the I/O device 120. The content of an operation to be requested is transmitted to each terminal 160 (FIG. 9).

Figure 10:
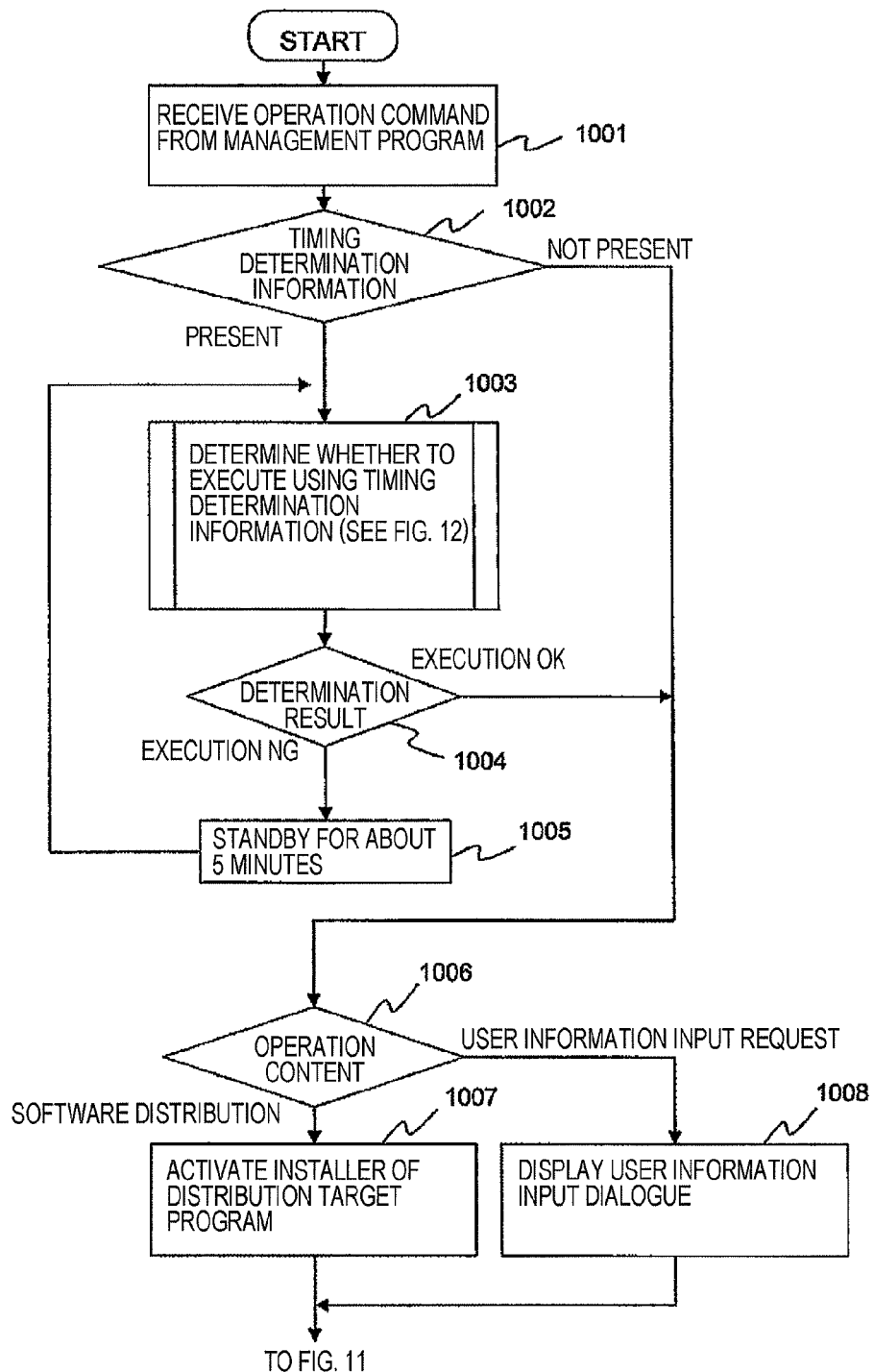
FIG. 10 is a flowchart illustrating a process of a management client program.
Figure 11:
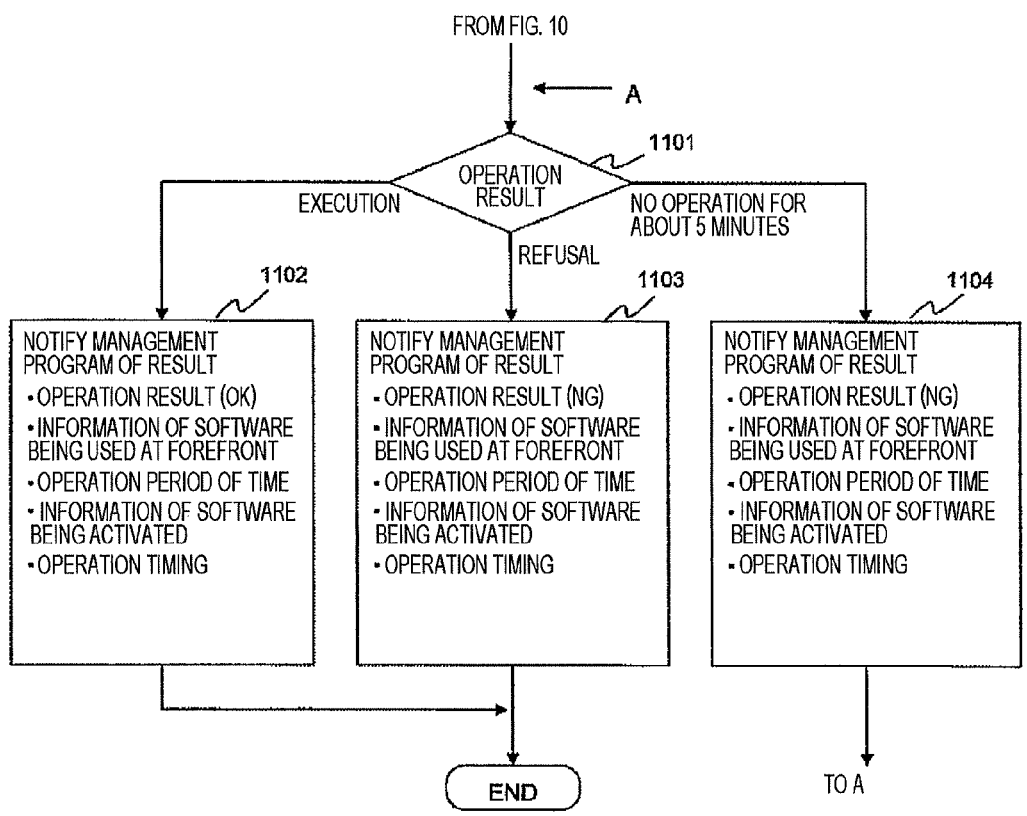
FIG. 11 is a flowchart illustrating the process of the management client program (subsequent to FIG. 10).

(2) Each terminal 160 executes a terminal operation based on the operation content transmitted from the management server 100 (FIG. 10 and FIG. 11).

Figure 12:
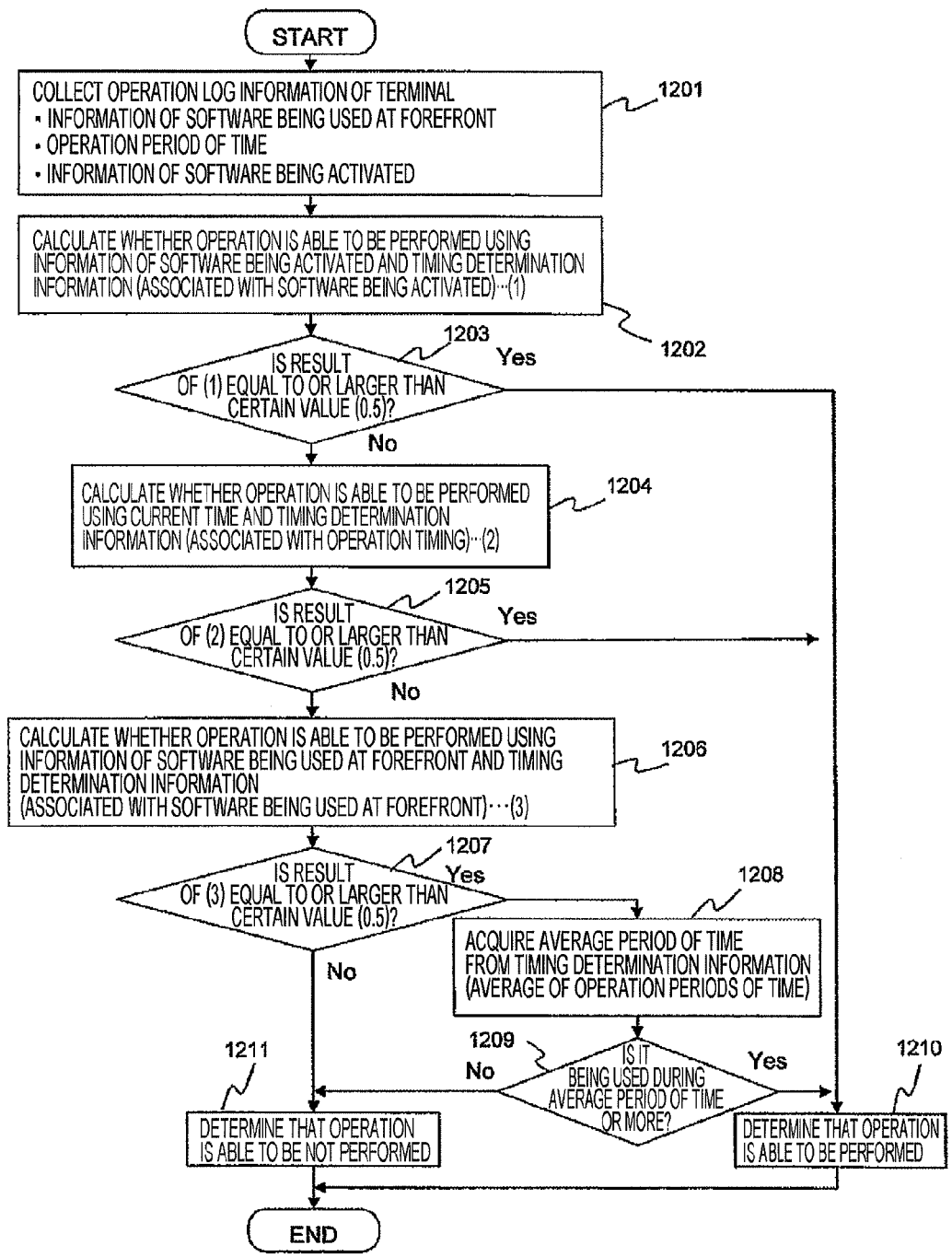
FIG. 12 is a flowchart illustrating a process of determining whether a dialogue display has to be executed.
Figure 13:
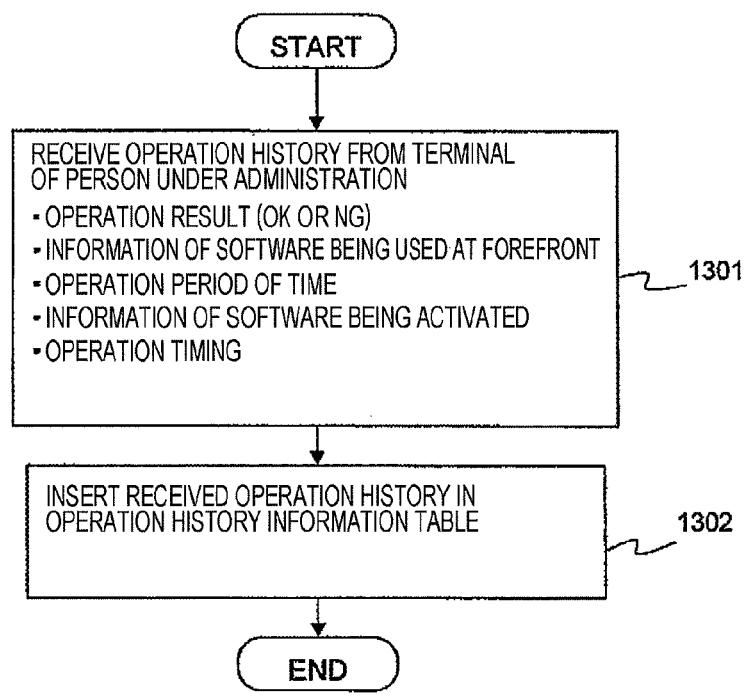
FIG. 13 is a flowchart illustrating a process of storing an operation result of an operator through a management program.

(3) The terminal 160 controls a display timing of a dialogue based on timing determination information which will be described later during the process (2), and transmits the operation result to the management server 100, and the management server 100 stores the received operation result (FIG. 12 and FIG. 13).

Figure 14:
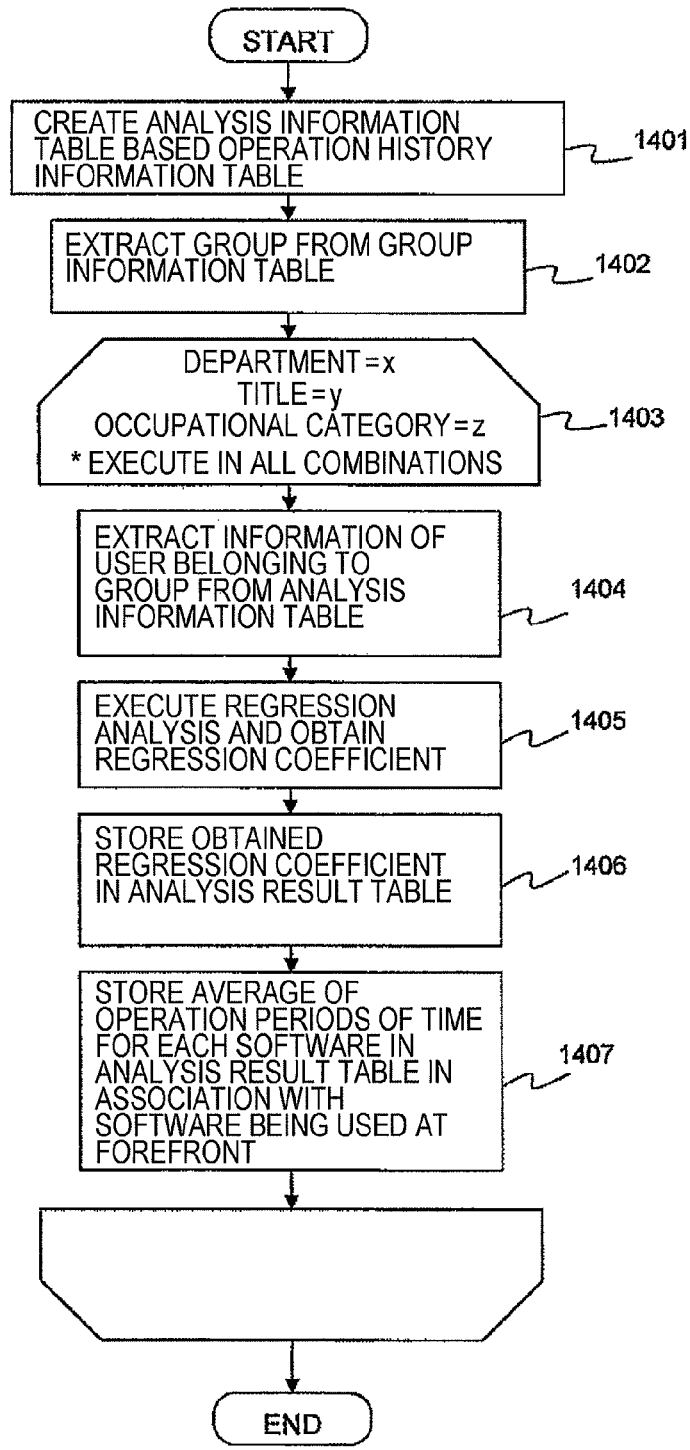
FIG. 14 is a flowchart illustrating a process of creating timing determination information.

(4) The management server 100 performs analysis (regression analysis) on the received operation result, generates (new) timing determination information based on the analysis result, and transmits the generated timing determination information to each terminal 160. Each terminal 160 updates timing determination information which is referred to in the process (3) based on the received (new) timing determination information (FIG. 14).

The above process is repeated at certain time intervals.

FIG. 9 is a flowchart illustrating a process of the management program 111 of the management server 100, and illustrates a process of receiving a screen operation of the administrator and requesting the operator terminal to perform an operation ((1) of FIG. 8).

In response to an operation performed through the I/O device 120 by the administrator, the management program 111 acquires information for requesting the operator terminal 160 to perform an operation (901). Specifically, the information to be acquired includes an operation execution timing, operation content, and an operation execution time limit when an execution timing is not "immediate execution."

Figure 17:
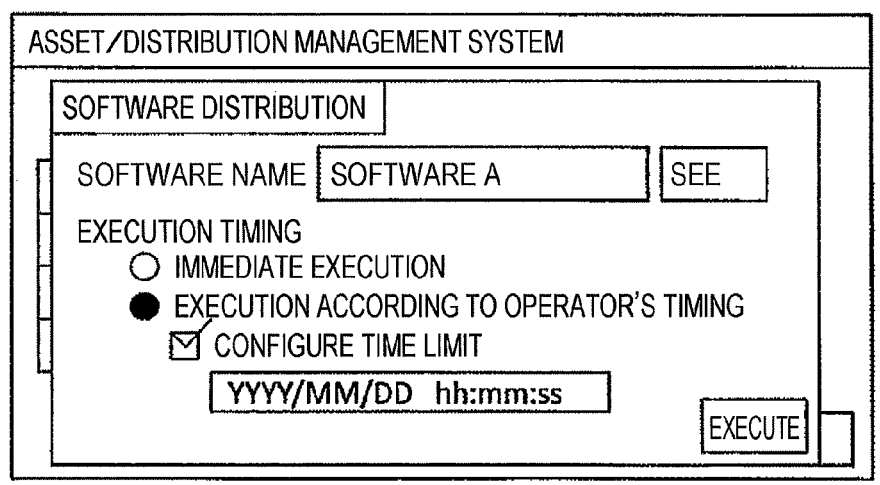
FIG. 17 illustrates an exemplary screen used to select an execution timing.

FIGS. 15, 16, and 17 illustrate exemplary screen displays corresponding to the administrator's operation.

Referring to FIG. 15, a device list in which various apparatuses (terminals) are associated with information related to operators using the apparatuses (terminals) is displayed, and so the administrator selects an apparatus (the terminal 160) which is to be requested to perform an operation from the device list. Further, when "operation menu" at the lower right of FIG. 15 is designated, an operation list (for example, menu content of software distribution and user information input) is displayed as illustrated in FIG. 16, and thus the administrator selects an operation content from the list. Further, when "software distribution" is selected in the operation content, a screen used to designate a software distribution timing is displayed as illustrated in FIG. 17, and thus the administrator inputs an execution timing. FIG. 17 illustrates an example in which "execution according to operator's timing (of terminal 160)" is selected as an execution timing, a time limit is configured, and a date and time of a specific time limit is input.

The description continues with reference back to FIG. 9. It is determined whether an execution timing designated according to the administrator's operation as illustrated in FIG. 17 is "immediate execution" (902), the process proceeds to step 904 when the execution timing is "immediate execution", and timing determination information of corresponding group is acquired from the analysis result table 118 illustrated in FIG. 7 for each terminal when the execution timing is "execution according to operator's timing" (903). In other words, timing-related information of each group acquired most recently is acquired.

The management program 111 determines whether the operation content designated by the administrator's operation as illustrated in FIG. 16 is software distribution (904), acquires a distribution target program when the operation content is the software distribution (905), and transmits the following content to the terminal selected as illustrated in FIG. 15 as an operation command (operation content of FIG. 8) (906). In other words, a distribution target program installer, timing determination information (when present), and a time limit (when present) are transmitted as the operation command.

When the operation content is determined to be a user information input request in step 904, the following content is transmitted to the terminal 160 selected as illustrated in FIG. 15 as the operation command (907). In other words, the user information input request, the timing determination information (when present), and a time limit (when present) are transmitted as the operation command.

FIG. 10 is a flowchart illustrating a process of the management client program 171 at the operator terminal 160, and is a diagram illustrating a process ((2) and (3) of FIG. 8) of executing an operation requested from the management program 111.

The management client program 171 receives the operation command (operation content) from the management program 111 of the management server 100 (1001).

The management client program 171 determines whether there is timing determination information in the operation command (1002). When there is no timing determination information, the process proceeds to step 1006, but when there is timing determination information, it is determined whether content of the operation designated by the administrator has to be performed using the timing determination information (1003). The details of this step will be described later with reference to FIG. 12. It is determined whether the determination result "execution OK" or "execution NG" (1004). The management client program 171 proceeds to next step 1006 when the determination result is "execution OK," and executes step 1003 again after being on standby for about 5 minutes (it is about 5 minutes when a terminal operation is assumed, but a period of time is arbitrary) when the determination result is "execution NG."

Although not illustrated, a time limit is configured in the operation command, and when the determination result is "execution NG" and the time limit is exceeded if it is on standby for about 5 minutes, "execution OK" is determined in step 1004 for timing determination.

Figure 18:
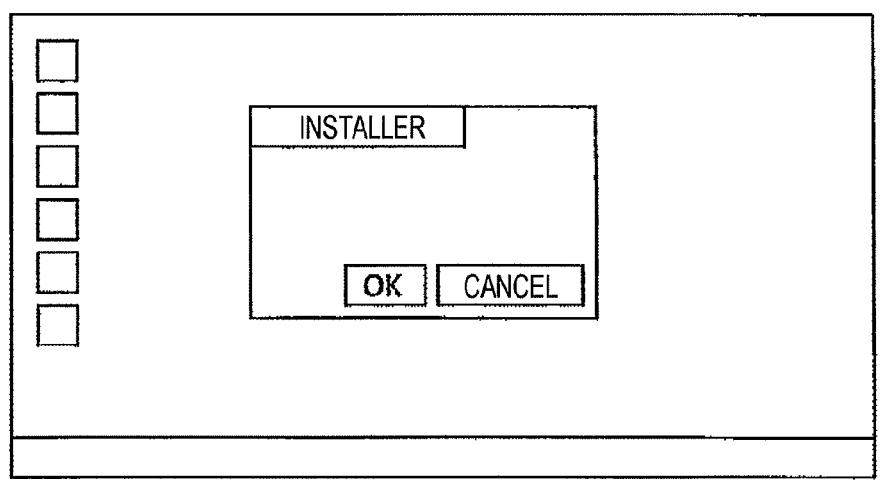
FIG. 18 illustrates an exemplary screen of an operator terminal.

The management client program 171 determines whether the content of the operation designated by the administrator is "software distribution" or "user information input request" as illustrated in FIG. 16 (1006). When the operation content is "software distribution," the distribution target program installer included in the operation command is activated in response to Confirmation of the operator (1007), but when the operation content is "user information input request," a user information input dialogue is displayed (1008). FIG. 18 illustrates an exemplary screen of the operator terminal 160 when the operation command in which the operation content is "software distribution" is received from the management program 111.

After the operator executes the operation content, as illustrated in FIG. 11, the management client program 171 determines the operation result (1101), and executes any one of the following three processes according to the operation result.

When the operation result is "execution," a notification of the following result is given to the management program 111. In other words, an operation result (OK), information of software being used at the forefront, an operation period of time (of software being used at the forefront), information of software being activated, and an operation timing are notified of (1102).

When the operation result is refusal, a notification of the following result is given to the management program 111. In other words, an operation result (NG), information of software being used at the forefront, an operation period of time (of software being used at the forefront), information of software being activated, and an operation timing are notified of (1103).

When there is no operation for about 5 minutes, a notification of the following result is given to the management program 111. In other words, an operation result (NG), information of software being used at the forefront, an operation period of time (of software being used at the forefront), information of software being activated, and an operation timing are notified of (1104), and thereafter, an operation result is determined again (1101).

FIG. 12 is a flowchart illustrating a process (1003 of FIG. 10) of determining whether a dialogue display (operation content) has to be executed based on the timing determination information through the management client program 171.

The management client program 171 collects operation log information of the terminal 160 including the following information from the terminal 160 being operated. In other words, information of software being used at the forefront, an operation period of time (of software being used at the forefront), and information of software being activated are collected (1201).

The management client program 171 calculates a value used to decide whether it is possible to perform an operation using information of software being activated and the timing determination information (associated with software being activated) (calculation 1) (1202).

The management client program 171 determines whether a result of the calculation 1 is a certain value (0.5) or more (1203). When the result of the calculation 1 is the certain value or more, the process proceeds to step 1210, but when the result of the calculation 1 is the certain value or less, the management client program 171 calculates a value used to decide whether it is possible to perform an operation using a current time and a timing determination information (associated with an operation timing) (calculation 2) (1204).

The management client program 171 determines whether a result of the calculation 2 is a certain value (0.5) or more (1205). When the result of the calculation 2 is the certain value or more, the process proceeds to step 1210, but when the result of the calculation 2 is the certain value or less, the management client program 171 calculates a value used to decide whether it is possible to perform an operation using information of software being used at the forefront and timing determination information (associated with software being used at the forefront) (calculation 3) (1206).

The management client program 171 determines whether a result of the calculation 3 is a certain value (0.5) or more (1207). When the result of the calculation 3 is the certain value or more, the process proceeds to step 1208, but when the result of the calculation 3 is the certain value or less, it is determined that it is difficult to perform an operation (execution NG), and then the process ends (1211).

When the result of calculation 3 is the certain value or more, the management client program 171 acquires an average period of time from the timing determination information (average of operation periods of time) (1208), and determines whether an average period of time or more has elapsed (1209), determines that it is possible to perform an operation (execution OK) when an average period of time or more is determined to have elapsed (1210), and determines that it is difficult to perform an operation (execution NG) when an average period of time or more is determined not to have elapsed (1211), and then the process ends.

FIG. 13 is a flowchart illustrating a process of storing information (operation result) received from the operator terminal 160 through the management program 111 of the management server 100.

The management program 111 receives an operation history corresponding to the user ID 117b of the operator illustrated in FIG. 5 from the operator terminal 160 (1301). The operation history to be received includes an operation result (OK or NG), information of software being used at the forefront, an operation period of time (of software being used at the forefront), information of software being activated, and an operation timing. The received operation history information is inserted into the operation history information table (1302).

FIG. 14 is a flowchart illustrating a process ((4) of FIG. 8) of analyzing the operation history information table at the frequency of once per day (once per day is a rough idea, and the frequency is arbitrary) and newly creating the timing determination information through the management program ill of the management server 100.

The management program 111 creates the analysis information table 115 illustrated in FIG. 6 based on the operation history information table 117 illustrated in FIG. 5 (1401). Then, the management program 111 extracts a group from the group information table 116 illustrated in FIG. 3 (1402).

The management program 111 executes the following steps 1404 to 1407 on all combinations of "department=x," "title=y," and "occupational category=z."

Information of the user (the user ID) belonging to a group (for example, a group of a department ID=1, a title ID=1, and an occupational category ID=1) is extracted from the analysis information table 115 (1404). Regression analysis is executed to obtain a regression coefficient (1405). The details of a calculation in the regression analysis will be described later.

The regression coefficient obtained in step 1405 is stored in the analysis result table 118 illustrated in FIG. 7 (1406). Further, an average of operation periods of time of each software is stored in the analysis result table 118 illustrated in FIG. 7 in association with software being used at the forefront (1407).

Here, a process of creating the timing determination information by the regression analysis will be described.

When the number of users is n and the number of software is P, a relation between an operation result and whether a program is activatable/usable is expressed by Formula (1):
[Formula 1]

$$(i=1 \text{ to } n, n \text{ is the number of users, and } P \text{ is the number of software}) \quad (1)$$

W(i): an operation result of a user i (which it is 1 in when it is OK and −1 when it is NG), ak: a regression coefficient of software k (a correlation coefficient), $x_k$(i): whether the user i can activate or use the software k (0/1)

Formula (1) includes a regression coefficient of software representing a correlation between an operation result and the software.

In order to optimize each regression coefficient, an optimal value of each regression coefficient is obtained from a condition in which a square error average σ of an actual operation result and whether a program is activatable/usable is minimum as in Formula (2).

Based on δσ/δak=0, (k=1 to P), among {ak} a large factor (ak) is calculated. → software having large influence can be understood. ({ak} is the timing determination information). [Formula 2]

It is understood that as the regression coefficient value obtained as described above increases, influence of software corresponding to the value on an operation result increases.

Using the regression coefficient of each soft obtained as described above and a flag (which is 1 when it is in use and −1 when it is not in use) of software being used (activated), the calculation of Formula (3) is performed to obtain a value (−1 and +1) representing whether it is possible to perform an operation, and it is determined whether it is possible to perform an operation in step 1210 or 1211 of FIG. 12 based on the obtained value.

Y: a value (−1 to +1) representing whether it is possible to perform an operation X1 to X6: a flag (which is 1 when it is in use and −1 when it is not in use) of software being used A to F: a value (the regression coefficient (ak)) of the timing determination information (software being used) [Formula 3]

For example, when software being used by the operator ("A department," "manager," and "administration") is software 102 and 106 of FIG. 7(*b*), the value representing whether it is possible to perform an operation, that is, Y is 0.8 (=−0.6*0+0.4*1+0*0+0*0+0.1*0+0.4*1) which is larger than the certain value (0.5), and thus it is determined that it is possible to perform an operation.

When it is determined whether it is possible to perform an operation at a certain operation timing (time zone), a time zone is used instead of a flag of software being used. As an operation timing, a time zone $Y_k(i)$ is used instead of $X_k(i)$. For example, as illustrated in FIG. 6(*c*), $y_1(i)$ is assumed to be 9:00 to 12:00, $y_2(i)$ is assumed to be 12:00 to 15:00, $y_3(i)$ is assumed to be 15:00 to 18:00, and $y_4(i)$ is assumed to be 18:00 to 21:00 (the number P of time zones is 4).

REFERENCE SIGNS LIST

100 management server
110, 170 memory/HDD
111 management program
112 distribution target program installer
113 user information
114 software information
115 analysis information
116 group information
117 operation history information
118 analysis result
120, 180 I/O device
130, 192 CPU
140, 191 NIC
160 operator terminal
150 network
171 management client program
172 application A
173 application B
174 distributed program
175 timing determination information

The invention claimed is:

1. A method of determining whether an operation is to be performed, the method comprising:
   collecting operation information for a terminal which responded to an input operation to the terminal, wherein the operation information includes a plurality of active indications of software applications that are active on the terminal and a plurality of forefront indications for software applications in the forefront on the terminal;
   retrieving from a database timing determination information associated with the plurality of active indications of software applications and the plurality of forefront indications for software applications in the forefront on the terminal;
   calculating a first calculation result based on the indication of the plurality of active indications and the timing determination information;
   comparing the first calculation result to a first threshold;
   if the first calculation result is less than the first threshold, calculating a second calculation result based on a current time and the timing determination information;
   comparing the second calculation result to a second threshold;
   if the second calculation result is less than the second threshold, calculating a third calculation result based on the plurality of forefront indications and the timing determination information;
   comparing the third calculation result to a third threshold; and
   determining that the operation is to be performed based on the first calculation result, the second calculation result and the third calculation result.

2. The method according to claim 1, further comprising:
   determining that the operation is able to be performed when the first calculation result is greater than or equal to the first threshold; and
   determining that the operation is able to be performed when the second calculation result is greater than or equal to the second threshold.

3. The method according to claim 2, further comprising:
   if the third calculation result is greater than or equal to the third threshold, acquiring an average period of time from the timing determination information, and determining if the operation is able to be performed based on the average period of time.

4. The method according to claim 1, wherein the first calculation, the second calculation or the third calculation include one or more regression analyses.

5. A method of determining whether an input operation dialogue is displayable in a terminal in a computer system, the method comprising:
   acquiring, by a management server, operation information from the terminal, wherein the operation information includes a plurality of active indications for software applications that are active on the terminal and a plurality of forefront indications for software applications that are active in the forefront of the terminal;
   retrieving, by the management server, timing determination information associated with each of the plurality of active indications for software applications and each of the plurality of forefront indications for software applications in the forefront on the terminal;
   transmitting, by the management server, an operation command of the terminal and the timing determination information to the terminal;
   receiving, by the terminal, the operation command and the timing determination information from the management server;
   calculating, by the terminal, a first calculation result based on the plurality of active indications and the timing determination information;
   comparing, by the terminal, the first calculation result to a first threshold;

if the first calculation result is less than the first threshold, calculating, by the terminal, a second calculation result based on a current time and the timing determination information;
comparing, by the terminal, the second calculation result to a second threshold;
if the second calculation result is less than the second threshold, calculating, by the terminal, a third calculation result based on the plurality of forefront indications and the timing determination information;
comparing, by the terminal, the third calculation result to a third threshold;
transmitting, by the terminal, one or more of the first calculation result, second calculation result and the third calculation result to the server; and
displaying, by the terminal, a dialogue for executing the operation command based on the first calculation result, the second calculation result and the third calculation result.

6. The method according to claim 5, further comprising:
displaying, by the terminal, the dialogue for executing the operation command when the first calculation result is greater than or equal to the first threshold; and
displaying, by the terminal, the dialogue for executing the operation command when the second calculation result is greater than or equal to the second threshold.

7. The method according to claim 5,
wherein the first calculation, the second calculation or the third calculation include one or more regression analyses.

8. The method according to claim 5, further comprising:
if the third calculation result is greater than or equal to the third threshold, acquiring, by the terminal, an average period of time from the timing determination information; and
displaying, by the terminal, the dialogue for executing the operation command based on the average period of time.

9. A computer system, comprising:
a management server; and
a terminal communicatively connected with the management server;
wherein the management server is configured to:
acquire operation information from the terminal, wherein the operation information includes a plurality of active indications for software applications that are active on the terminal and a plurality of forefront indications for software application are active in the forefront of the terminal,
retrieve timing determination information associated with each of the plurality of active indications for software applications and each of the plurality of forefront indications for software applications in the forefront on the terminal,
transmit an operation command of the terminal and the timing determination information to the terminal, and
store one or more of a first calculation result, a second calculation result and a third calculation result received from the terminal;
wherein the terminal is configured to:
receive the operation command and the timing determination information from the management server,
calculate the first calculation result based on the plurality of active indications and the timing determination information,
compare, the first calculation result to a first threshold,
if the first calculation result is less than the first threshold, calculate the second calculation result based on a current time and the timing determination information,
compare the second calculation result to a second threshold,
if the second calculation result is less than the second threshold, calculate a third calculation result based on the plurality of forefront indications and the timing determination information,
compare the third calculation result to a third threshold,
transmit one or more of the first calculation result, second calculation result and the third calculation result to the server, and
display a dialogue for executing the operation command based on the first calculation result, the second calculation result and the third calculation result.

10. The computer system according to claim 9,
wherein the terminal is further configured to:
display the dialogue for executing the operation command when the first calculation result is greater than or equal to the first threshold, and
display the dialogue for executing the operation command when the second calculation result is greater than or equal to the second threshold.

11. The computer system according to claim 9,
wherein the first calculation, the second calculation or the third calculation include one or more regression analyses.

12. The computer system according to claim 9, wherein the terminal is further configured to:
if the third calculation result is greater than or equal to the third threshold, acquire an average period of time from the timing determination information, and
display the dialogue for executing the operation command based on the average period of time.

* * * * *